US012592117B2

(12) United States Patent (10) Patent No.: US 12,592,117 B2
McNierney et al. (45) Date of Patent: Mar. 31, 2026

(54) DEVICE FOR STABILIZING GAMING MACHINE

(71) Applicant: Aristocrat Technologies, Inc.

(72) Inventors: James McNierney, Las Vegas, NV (US); Michael Bristol, Las Vegas, NV (US); Joshua Gonzalez, Las Vegas, NV (US); Brian Goldstein, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 235 days.

(21) Appl. No.: 18/478,981

(22) Filed: Sep. 29, 2023

(65) Prior Publication Data

US 2025/0111737 A1 Apr. 3, 2025

(51) Int. Cl.
G07F 17/32 (2006.01)
A63F 13/90 (2014.01)

(52) U.S. Cl.
CPC .......... G07F 17/3216 (2013.01); A63F 13/90 (2014.09)

(58) Field of Classification Search
CPC ............................ A63F 13/90; G07F 17/3216
See application file for complete search history.

(56) References Cited

U.S. PATENT DOCUMENTS

| | | | |
|---|---|---|---|
| 6,514,145 B1 * | 2/2003 | Kawabata | A63F 13/90 |
| | | | 463/20 |
| 8,795,070 B2 | 8/2014 | Beadell | |
| 2008/0205007 A1 * | 8/2008 | Yang | G07F 17/3216 |
| | | | 361/725 |
| 2010/0236454 A1 * | 9/2010 | Parizek | A47B 3/10 |
| | | | 108/38 |
| 2022/0151388 A1 | 5/2022 | Waller | |
| 2022/0234386 A1 | 7/2022 | McKay | |
| 2023/0024888 A1 * | 1/2023 | Ocampo | G07F 17/3211 |
| 2023/0091387 A1 | 3/2023 | Rodriguez | |
| 2023/0377410 A1 * | 11/2023 | Voloh | G07F 17/3216 |
| 2024/0115961 A1 * | 4/2024 | Gibson | G07F 17/3202 |

* cited by examiner

Primary Examiner — Jasson H Yoo
(74) Attorney, Agent, or Firm — Weaver Austin Villeneuve & Sampson LLP

(57) ABSTRACT

An apparatus may include a display housing that may include a display mount interface configured to securely mount a main display module and a housing extension interface at a first side of a bottom end of the display housing. The housing extension interface may be configured to securely mount a housing extension to the display housing. The apparatus may further include at least one stabilizer connected with the display housing and configured to be movable between a deployed configuration and a stowed configuration. When in the deployed configuration, the stabilizer may extend outward from a second side opposite the first side of the bottom end of the display housing by at least a predetermined amount. When in the stowed configuration, the stabilizer may not extend outward from the second side of the housing by the predetermined amount.

20 Claims, 12 Drawing Sheets

DEVICE FOR STABILIZING GAMING MACHINE

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Electronic gaming machines ("EGMs") or gaming devices provide a variety of wagering games such as slot games, video poker games, video blackjack games, roulette games, video bingo games, keno games, and other types of games that are frequently offered at casinos and other locations. For ease of design, manufacturing, and shipping. EGMs may include multi-component assemblies. Even though the assembled EGM may be tall but balanced, some of the components are tall and unbalanced in the unassembled or partially assembled state and are thus vulnerable to tipping when in some free-standing states during the assembly process.

For instance, an EGM may include a display housing designed to accommodate one or more display modules and additional housing extension(s), such as a button deck for user interaction and/or player seats for user comfort. Such display housings may be relatively thin and tall (e.g., at least 8 feet tall, such as between 9 feet to 11 feet) to accommodate the large main display modules that may be used in such EGMs without having the EGM consume an undesirably large amount of floor space in the assembled state.

As will be discussed in detail below, the display housing may include a housing extension interface configured to connect the display housing with the additional housing extension(s). When completely installed (e.g., with the housing extensions being securely mounted to the display housing extension), the display housing's stability may be greatly improved by virtue of the assembled EGM having a lower center of gravity and expanding the effective base of the display housing. However, in the unassembled or intermediate states, components like the display housing-especially when the display housing is already equipped with the main display module but is not connected with housing extensions—can be unsteady and imbalanced. This poses potential safety risks.

Accordingly, the technical solutions disclosed herein address these concerns by adding one or more stabilizers to the display housing that can be deployed during assembly of the EGM and then retracted or stowed after assembly. This prevents potential tipping in the pre-installation/assembly phase and improves the fore/aft stability of the intermediate components, ensuring those components meet stability criteria even before full installation.

In some implementations, an apparatus may include a display housing. The display housing may include a display mount interface configured to securely mount a main display module and a housing extension interface at a first side of a bottom end of the display housing. The housing extension interface may be configured to securely mount a housing extension to the display housing. The display housing may be configured to support the main display module in an elevated position relative to a floor when the main display module is mounted to the display mount interface and the bottom end of the display housing is resting on the floor. The apparatus may further include at least one stabilizer connected with the display housing and configured to be movable between a deployed configuration and a stowed configuration. When in the deployed configuration, the stabilizer may extend outward from a second side opposite the first side of the bottom end of the display housing by at least a predetermined amount. When in the stowed configuration, the stabilizer may not extend outward from the second side of the housing by the predetermined amount.

In some implementations, the housing extension may include a button deck configured to provide a user interface, a player seat configured to provide seating for a user of the apparatus or both.

In some implementations, the apparatus may further include the main display module and the main display module may be mounted to the display mount interface.

In some implementations, the display housing may be no more than 2.5 inches (e.g., no more than 2 inches) thick in a direction perpendicular to the second side and above the bottom end of the display housing.

In some implementations, wherein when mounted in the elevated position relative to the floor, the center of gravity of the main display may be at least 7 feet (e.g., at least 7.23 feet) away from the bottom end of the display housing.

In some implementations, the main display module may further include a monitor with a diagonal size of at least 28 inches.

In some implementations, the at least one stabilizer may include an elongated member.

In some implementations, the apparatus may further include at least one linear guide configured to guide the elongated member during movement between the stowed configuration and the deployed configuration, where when the at least one stabilizer is in the stowed configuration, at least a portion of the elongated member may be retracted into the linear guide further than when the at least one stabilizer is in the deployed configuration.

In some implementations, the elongated member may have a length equal to or shorter than a length of the linear guide such that, when in the stowed configuration, the elongated member can fully retract into the linear guide.

In some implementations, the elongated member may include a first end, where when the at least one stabilizer is in the deployed configuration, the first end extends outward from the second side of the bottom end of the display housing, a second end opposite the first end, and a first positive stop positioned between the first end and the second end. When the at least one stabilizer is in the deployed configuration, the first positive stop may engage with a feature of the linear guide to stop the elongated member from further extending outward from the second side of the bottom end of the display housing beyond the predetermined amount.

In some implementations, the elongated member may further include a second positive stop positioned at the first end of the elongated member, where the second positive stop may be configured to be fastened to the second side of the display housing when in the stowed configuration.

In some implementations, when moving the stabilizer between the stowed configuration and the deployed configuration, at least a portion of the elongated member may rotate outward from the display housing and about an axis that is above the bottom end of the display housing.

In some implementations, the axis may be parallel to the floor when the bottom end of the display housing is resting on the floor.

In some implementations, when moving the stabilizer from the stowed configuration to the deployed configuration, the axis may move down toward the bottom end of the display housing.

In some implementations, when moving the stabilizer from the stowed configuration to the deployed configuration, the axis may stay fixed and the elongated member extends such that, when the stabilizer is in the deployed configuration, a lower end of the elongated member may reach the floor when the bottom end of the display housing is resting on the floor.

In some implementations, the axis may be perpendicular to the floor when the bottom end of the display housing is resting on the floor.

In some implementations, the elongated member may engage the display housing through a four-bar linkage mechanism.

In some implementations, the at least one stabilizer may include two stabilizers, the display housing may further include a cable port located at the bottom end of the display housing and between the two stabilizers, and the cable port may be configured to accommodate cables.

In some implementations, may further include one or more wheels located at the bottom end of the display housing. The one or more wheels may protrude from the bottom end of the display housing to a greater extent than the at least one stabilizer.

In some implementations, the one or more wheels may include a first set of wheels including at least one wheel, and a second set of wheels including at least one wheel. The one or more wheels may be aligned such that the first set of wheels is positioned closer to the first side of the bottom end of the display housing than the second set of wheels.

This summary is neither intended to identify key or essential features of the claimed subject matter nor be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
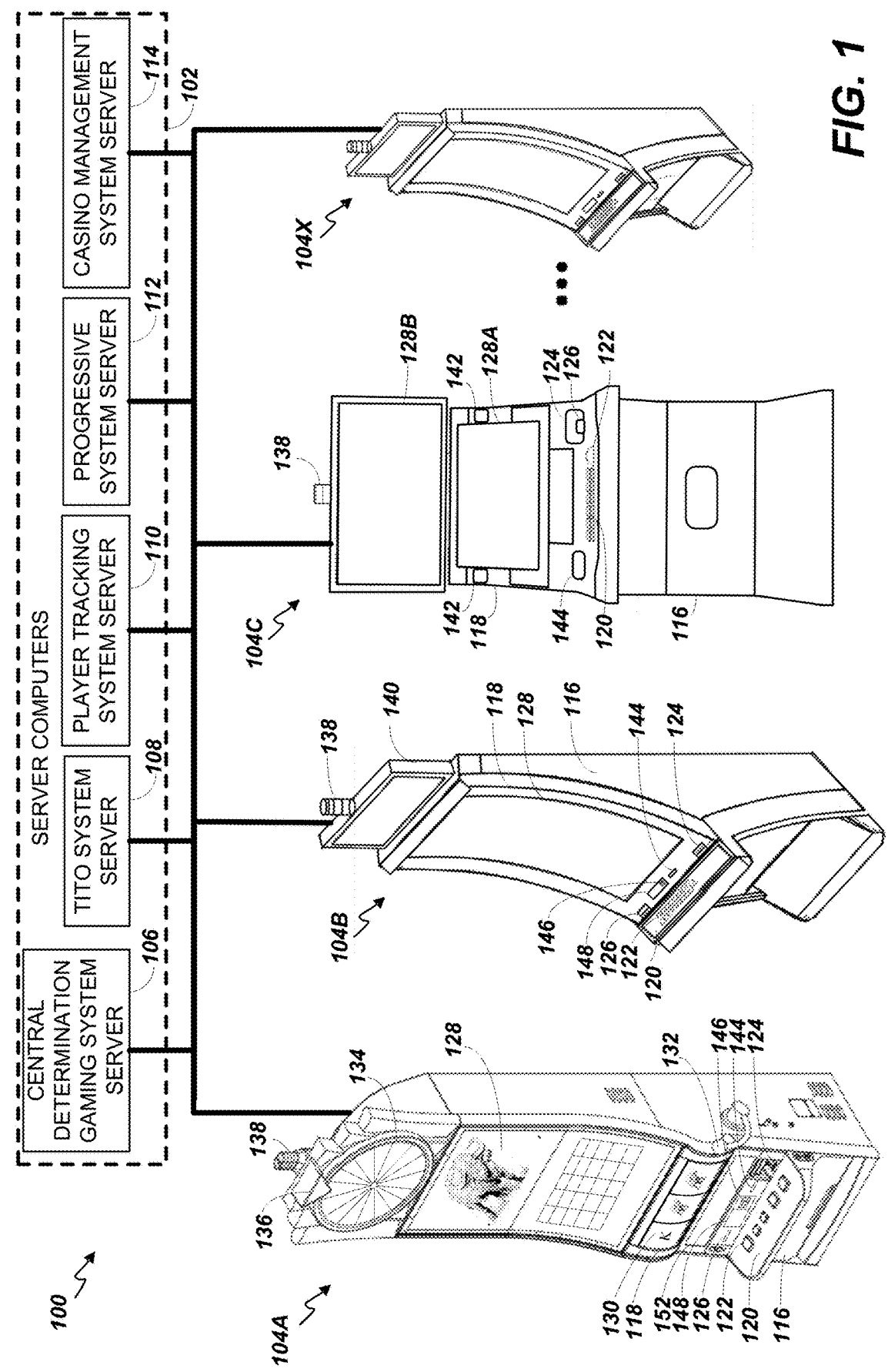
FIG. 1 is an example diagram showing several EGMs networked with various gaming-related servers.

Like reference symbols in the various drawings indicate like elements, in accordance with certain example implementations. In addition, multiple instances of an element may be indicated by following a first number for the element with a letter or a hyphen and a second number. For example, multiple instances of an element 110 and/or different portions/sides of element 110 may be indicated as 110-1, 110-2, 110-3 etc. or as 110a, 110b, 110c, etc. Unless specifically pointed out, when referring to such an element using only the first number, any instance/portions/sides of the element is to be understood (e.g., element 110 in the previous example would refer to elements 110-1, 110-2, and 110-3 or to elements 110a, 110b, and 110c).

DETAILED DESCRIPTION

For ease of design, manufacturing, and shipping, electronic gaming machines (EGMs) or gaming devices may be composed of multi-component assemblies, often with modular designs. While the assembled EGM may be tall and balanced, certain sub-components may be tall and thin. Such components may be susceptible to tipping when standing upright and not assembled to the remaining EGM components, e.g., as such components may be during the assembly process.

For instance, an EGM may include a display housing designed to accommodate one or more display modules and additional housing extensions, such as a button deck for user interaction and/or player seats for user comfort. In some embodiments, the display modules may feature a main display module which may include a monitor having a diagonal of at least 26 inches (e.g., 28 inches). When mounted, the center of gravity of the main display module may be at least 7 feet away from a bottom end of the display housing in the elevated position relative to the floor, thereby centering the main display module at a location that places the center of the display module at a height that provides a player using the EGM with a comfortable viewing experience. As such, the display housing may be of at least 8 feet tall, such as between 9 feet to 11 feet tall to provide proper mounting to the main display module.

Assembled EGMs are designed according to industry safety regulations that are designed to minimize the risk of assembled EGMs falling over and injuring patrons or personnel. For instance, guidelines dictate that an assembled EGM should exhibit a minimum level of stability that reduces the chance of the EGM tipping over and presenting injury risks arise for users or personnel. However, in the unassembled or intermediate assembly states, components like the display housing-especially when the display housing is already equipped with the main display module but lacks other housing extensions (and is thus in its most top-heavy state)—can be unsteady and imbalanced. This poses potential safety risks.

Accordingly, the technical solutions disclosed herein address these concerns by adding one or more stabilizers to the display housing that can be deployed during assembly and then retracted or stowed after assembly. This prevents potential tipping in the pre-installation/assembly phase and improves the fore/aft stability (e.g., in forward and backward directions, as will be discussed in detail below) of the intermediate components, ensuring those components meet stability criteria even before full installation.

In some embodiments, the display housing may include a display mount interface configured to securely mount a main display module. The display housing may also include a housing extension interface at a first side of a bottom end of the display housing that is configured to securely mount a housing extension to the display housing. As mentioned above, when the housing extension (e.g., the button deck) is securely mounted to the display housing (e.g., through the display housing interface, in the complete installation state), the stability of the display housing may be ensured by redistributing the center of gravity of the display housing (e.g., by lowering the center of gravity of the display housing) and expanding the effective base of the display housing. To provide the above-mentioned fore/aft stability to the display housing in the pre-installation phase, the display housing may further include at least one stabilizer configured to prevent the display housing from tipping over when the bottom end of the display housing is resting on the floor. For example, the at least one stabilizer may be connected to the display housing and may be configured to be movable between a deployed configuration and a stowed configuration.

In some embodiments, when in the deployed configuration, the stabilizer may extend outward from a second side opposite the first side of the bottom end of the display housing by at least a predetermined amount. For example, the stabilizer may include an elongated member (e.g., a bar, tube, or similar structure), and the EGM may further include a linear guide configured to guide the elongated member during movement between the stowed configuration to the deployed configuration. The stabilizer may include a first positive stop positioned between the two ends of the elongated member, such that when the at least one stabilizer is in the deployed configuration, the first positive stop engages with a feature of the linear guide to stop the elongated member from further extending outward from the second side of the bottom end of the display housing beyond the predetermined amount.

In some embodiments, for times other than during the assembly of the EGM, the stabilizer may be configured to be in the stowed configuration where the stabilizer does not extend outward from the second side of the housing by the predetermined amount. For example, at least a portion of the elongated member may be retracted into the linear guide further than when the at least one stabilizer is in the deployed configuration. In some embodiments, the elongated member may have a length equal to or shorter than a length of the linear guide such that, when in the stowed configuration, the elongated member can fully retract into the linear guide. In some embodiments, the elongated member may further include a second positive stop positioned at an end of the elongated member. In some embodiments, the second positive stop may include a flange configured to be fastened to the second side of the display housing when in the stowed configuration.

According to the technical solution disclosed herein, by "sticking out" (e.g., protruding out) of the display housing by at least the predetermined amount in the deployed configuration, the stabilizer can extend the effective base of the display housing and thus can increase the fore/aft stability of the display housing. As will be discussed in detail below, the predetermined amount may correspond to a space or region within the bottom portion of an EGM, for example, a housing extension interface (e.g., housing extension interface 430 in FIG. 4), connected to a linear guide (e.g., linear guide 660 in FIGS. 6A and 6B)). The linear guide, which can: (i) engage with, for example, stops on the stabilizer (e.g., positive stops 551 and 552 in FIG. 5), and (ii) reside within the space or region within the housing extension interface, may support the outward extension of and retraction of the stabilizer within the predefined amount.

The following discussion relates generally to EGMs that may be found in casino gaming environments and is then followed by a discussion relating to intermediate components of the EGM with enhanced fore/aft stabilities.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (Wi-Fi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main or service door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
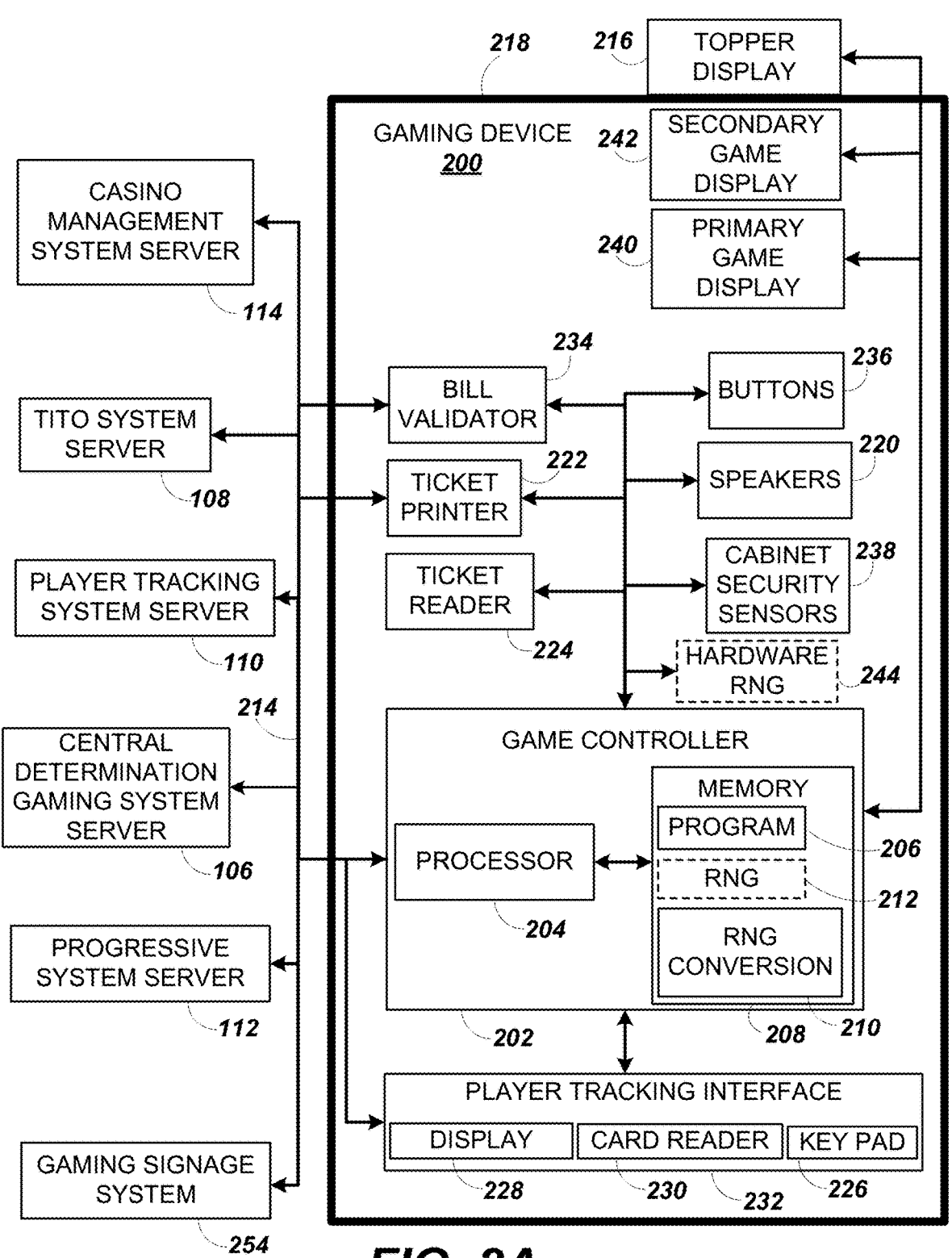
FIG. 2A is a block diagram showing various functional elements of an example EGM.

Many or all the above-described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main or service door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play, or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and non-volatile memory and other types of non-transitory data storage components. Volatile memory is memory that do not retain data values upon loss of power. Non-volatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random-access memory (DRAM), magnetic random-access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, and game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game displays 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate case of description and explanation.

Figure 2B:
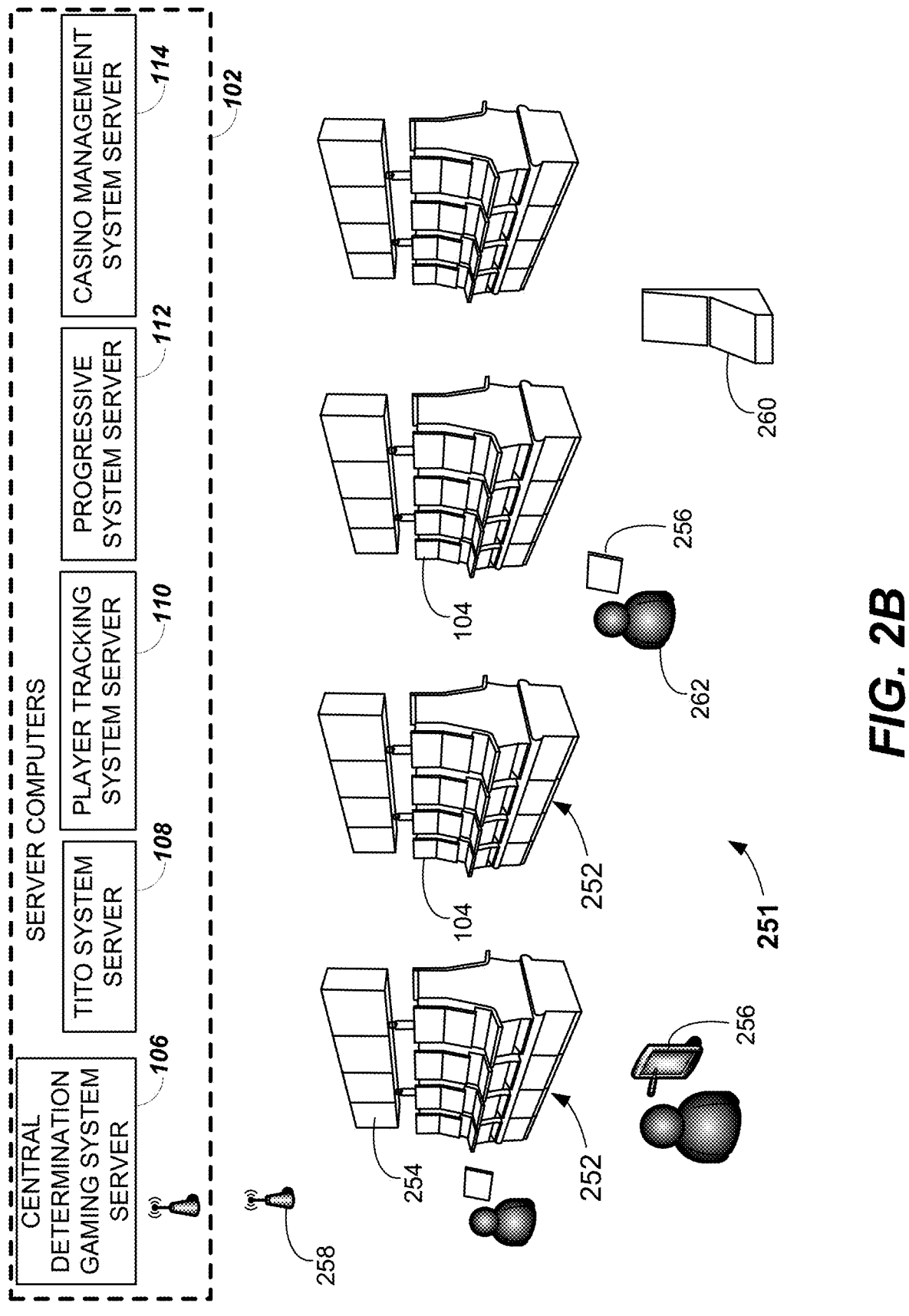
FIG. 2B depicts a casino gaming environment according to one example.

FIG. 2B depicts a casino gaming environment according to one example. In this example, the casino 251 includes banks 252 of gaming device 104. In this example, each bank 252 of gaming device 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the gaming device 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
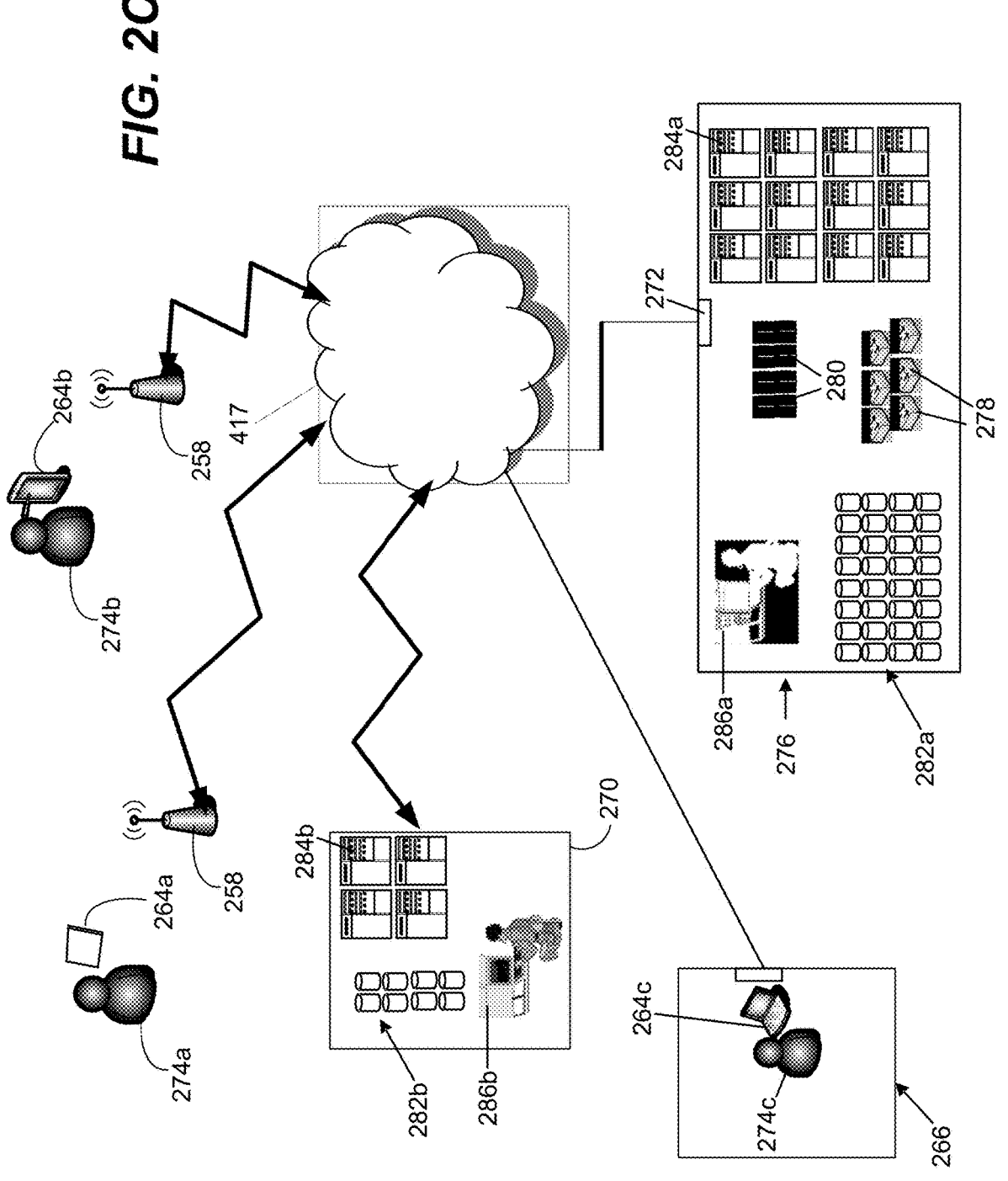
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
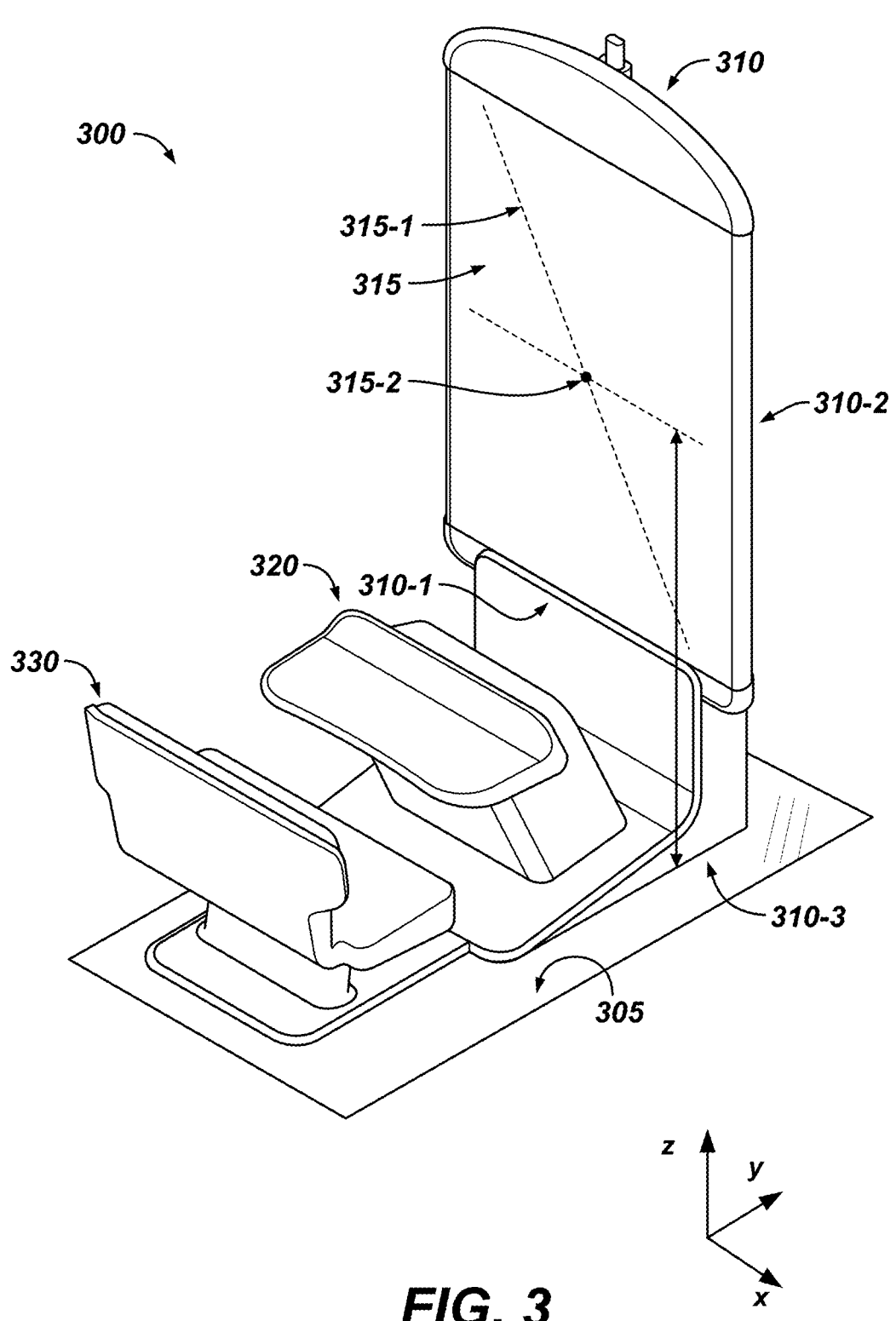
FIG. 3 illustrates an example gaming machine in accordance with various embodiments described herein.

FIG. 3 illustrates an example EGM in accordance with various embodiments described herein. In some embodiments, an EGM 300 may include a display housing 310 configured to mount a main display module 315 and housing extensions. In some embodiments, the housing extensions may include a button deck 320 configured to provide a user interface and/or a player seat 330 configured to provide seating for user(s) of the EGM 300. Specifically, in some embodiments, the display housing 310 may include a display mount interface (not shown) configured to securely mount the main display module 315 and a housing extension interface (not shown) at a first side 310-1 of a bottom end 310-3 of the display housing 310 configured to securely mount at least one housing extension to the display housing 310.

In some embodiments, as shown in FIG. 3, when mounted to the display mount interface, the main display module 315 may be supported in an elevated position relative to a floor 305 when the bottom end 310-3 of the display housing 310 is resting on the floor 305. For enhancing user experience, the main display module 315 may include a monitor with a diagonal size 315-1 of at least 28 inches, and when mounted in the elevated position relative to the floor 305, the center of gravity 315-2 of the main display 315 may be at least 7 feet away from the bottom end 310-3 of the display housing 310. In accordance with the embodiments of the present invention, the monitor may be a high-resolution LCD, plasma, LED, or OLED panel, which may be flat or curved as shown, a cathode ray tube, or other conventional electronically controlled video monitor.

In some embodiments, the button deck 320 may be mounted to the display housing 310 through the housing extension interface. For providing user interfaces, in some embodiments, the button deck 320 may be configured with input switches or buttons, a bill validator, a ticket printer, etc., to receive user input or provide output to a user. For example, the button deck 320 may include one or more physical buttons, touchscreens, trackballs, sliders, cameras, thermal sensors, etc. In some embodiments, the player seat 330 may be mounted to the display housing 310 through the housing extension interface and/or the button deck 320.

In further embodiments of the present invention, various other types or distinct combinations of housing extensions can be incorporated. It should be understood that the described mounting configurations are illustrative and not restrictive, and alternative configurations, not explicitly disclosed herein, are within the scope of the invention.

Figure 4:
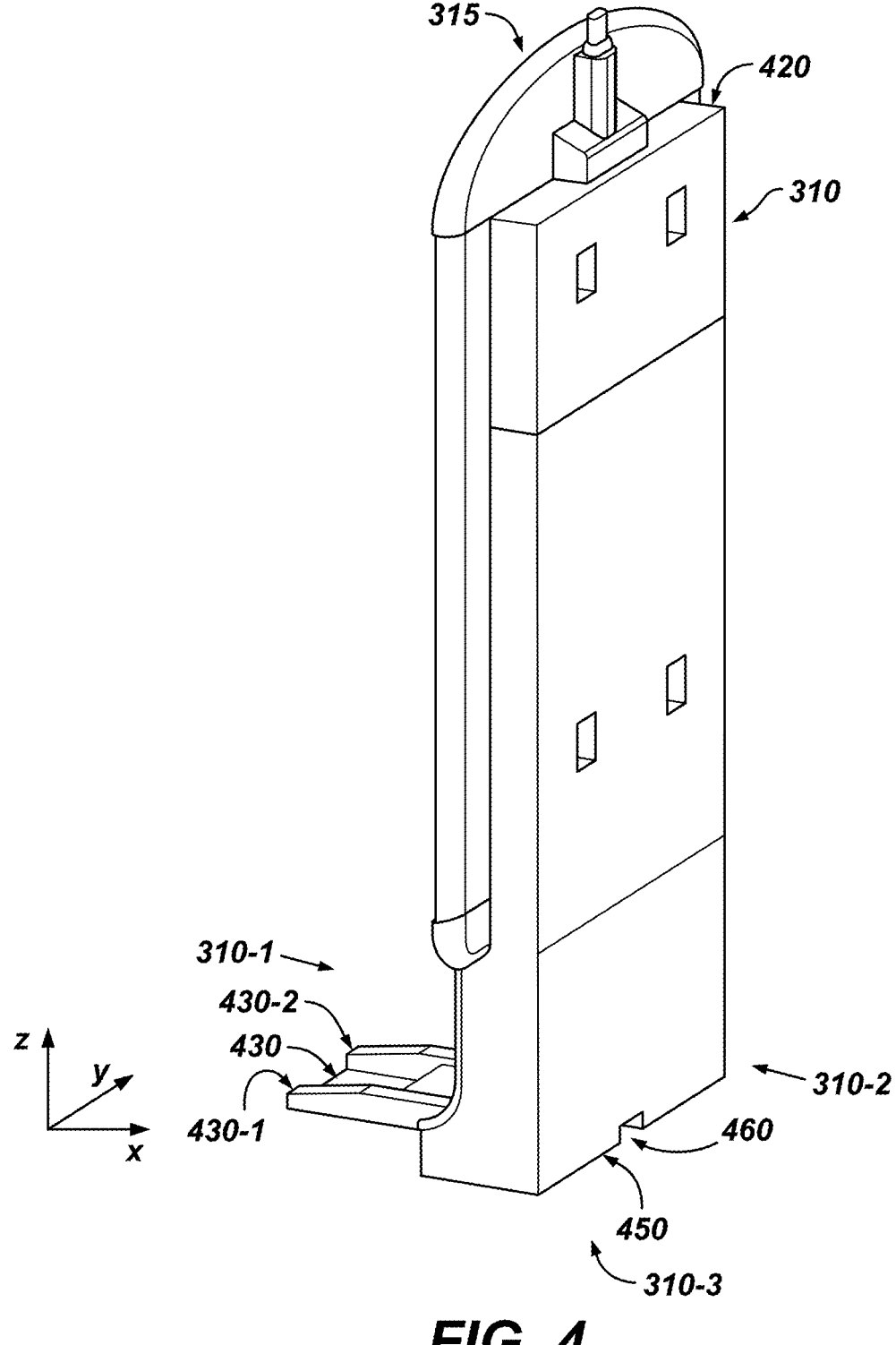
FIG. 4 illustrates an example display housing in accordance with various embodiments described herein.

As discussed above, to provide proper mounting to the main display 315 and the housing extensions (e.g., the button deck 320 and/or the player seat 330), the display housing 310 may be configured in a certain manner. For example, FIG. 4 illustrates an example display housing in accordance with various embodiments described herein. As shown in FIG. 4, the display housing 310 may include a display mount interface 420 (partially shown) configured to securely mount the main display module 315 and a housing extension interface 430 (partially shown) configured to securely mount at least one housing extension to the display housing 310. In some implementations, the display housing 310 may be no more than 2.5 inches thick in a direction perpendicular to the second side 310-2 and above the bottom end 310-3 of the display housing 310. Such display housings, may, by virtue of their relatively small thickness in combination with their height, be less stable and more prone to tipping over.

For example, the display mount interface 420, designed to securely mount the main display module 315, can be realized through various configurations, ensuring robustness and adaptability. In some other embodiments, the display mount interface 420 may include a mechanical clamp or bracket mechanism, clutching the edges or rear surface of main display module 315 for a firm grip. In some further embodiments, the display mount interface 420 may include adopting a snap-fit or interlocking arrangement, ensuring the display module 315 securely locks into place upon insertion. For enhanced security against unintended displacements, a screw-on mechanism or a combination of pegs and holes may be incorporated. Additionally or alternatively, certain embodiments might offer a quick-release system, facilitating rapid mounting and dismounting to minimize downtime should the display module ever need to be replaced. In some embodiments, main display module 315 can, for example, be a Video Electronics Standards Association (VESA)-standard mount, e.g., a mount that meets VESA's Flat Display Mounting Interface (FDMI) Mounting Interface Standard (MIS). While several embodiments are described herein, it is to be understood that these are illustrative. Other embodiments, or combinations thereof, for the display mount interface 420 are contemplated within the scope of the invention.

In some embodiments, the housing extension interface 430 may serve as a foundational seat for the housing extensions. As depicted in FIG. 4, by way of example, the housing extension interface 430 may include rails (e.g., rails

430-1 and 430-2) that may be inserted into corresponding channels or passages in the housing extensions. In some implementations, each of these rails may be designed with a dual-feature profile: a sloped portion transitioning into a flat portion. Mounting the housing extensions to the display housing through extension interface 430 as described herein may provide better fore/aft balancing (e.g., protection from tipping about x-axis) by redistributing the center of gravity of the display housing 310 (e.g., by lowering the center of gravity of the display housing 310) and expanding the effective base of the display housing 310 when different components are assembled. It is understood that the configuration of the housing extension interface 430 is not solely limited to what is described herein. Alternative configurations may have different housing extension interfaces depending on the specific housing extension to be mounted.

As stated above, components such as the display housing 310, particularly when fitted with the main display 315 (making it more top-heavy) but lacks other housing extensions (e.g., the button deck 320) that may stabilize the display housing 310, can be unstable and imbalanced in forward and backward directions in the unassembled or intermediate states (e.g., prone to tipping around the y-axis). This introduces potential safety concerns prior to the full assembly of the EGM.

To solve the abovementioned problem, the technical solution disclosed herein provides at least one stabilizer 450 connected with the display housing 310 and configured to be movable between a deployed configuration and a stowed configuration. In some embodiments, when in the deployed configuration, the stabilizer 450 may extend outward from a second side 310-2 of the bottom end 310-3 of the display housing 310 by at least a predetermined amount. For example, the predetermined amount may be 20 inches or more inches. When in the stowed configuration, the stabilizer 450 may not extend outward from the second side 310-2 of the display housing 310 by the predetermined amount. For example, the stabilizer 450 may, in at least some implementations, not extend outward from the second side 310-2 of the display housing 310 by any amount at all, or only by a very small amount, e.g., less than an inch. Accordingly, when in the deployed configuration, the stabilizer 450 may extend the effective base of the display housing 310 and thus provide extra support to the display housing 310 to increase the fore/aft stability of the display housing 310 in the unassembled or intermediate states.

In some embodiments, as will be discussed in detail below, the stabilizer may include an elongated member and the EGM may include a linear guide configured to guide the elongated member during movement between the stowed configuration to the deployed configuration. For case of shipping, when the stabilizer is in the stowed configuration, at least a portion of the elongated member may be retracted into the linear guide further than when the at least one stabilizer is in the deployed configuration. For example, the elongated member may be tubes/bars that may slide out horizontally from the linear guide in the back of the display housing in order to act as deployable feet that act to stabilize the display housing (e.g., extending the effective base of the display housing). The elongated member may slide back into the display housing once the EGM is in a more assembled (and stable) state or during transportation.

In some embodiments, the elongated member may include at least two positive stops to maintain its position in either the deployed or the stowed configurations. For instance, when in the deployed configuration, the first positive stop may engage with a feature of the linear guide, preventing the elongated member from extending further outward from the second side 310-2 of the bottom end 310-3 of the display housing 310 beyond a specified amount (e.g., the predetermined amount). In the stowed configuration, the second positive stop may be designed to fasten to the second side 310-2 of the display housing 310, preventing the elongated member from extending outward from the second side 310-2 of the bottom end 310-3 of the display housing 310. The configuration will be discussed in detail below.

Figure 5:
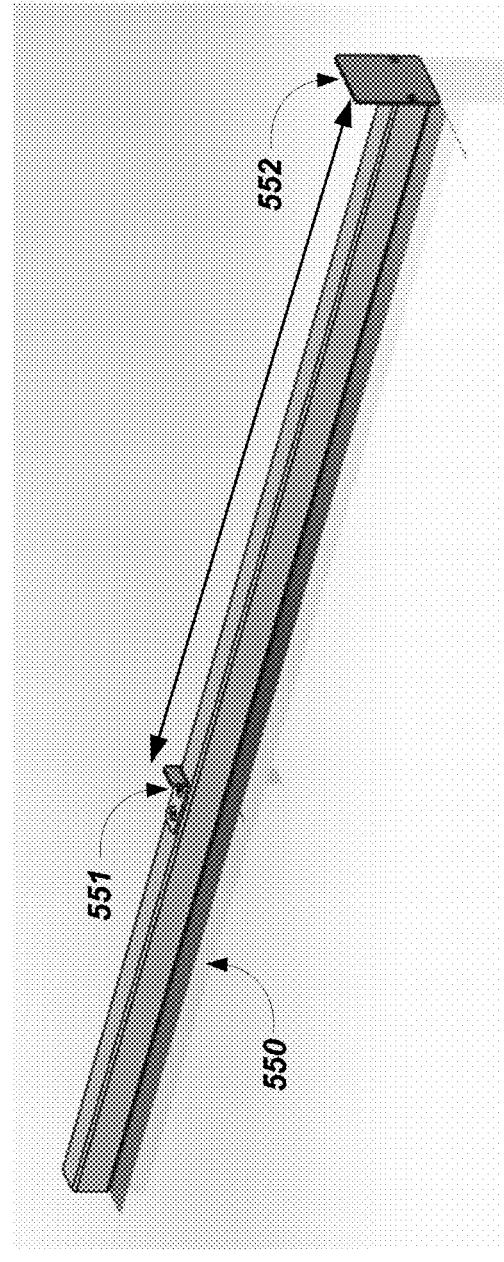
FIG. 5 illustrates an example elongated member in accordance with various embodiments described herein.
Figures 6A, 6B:
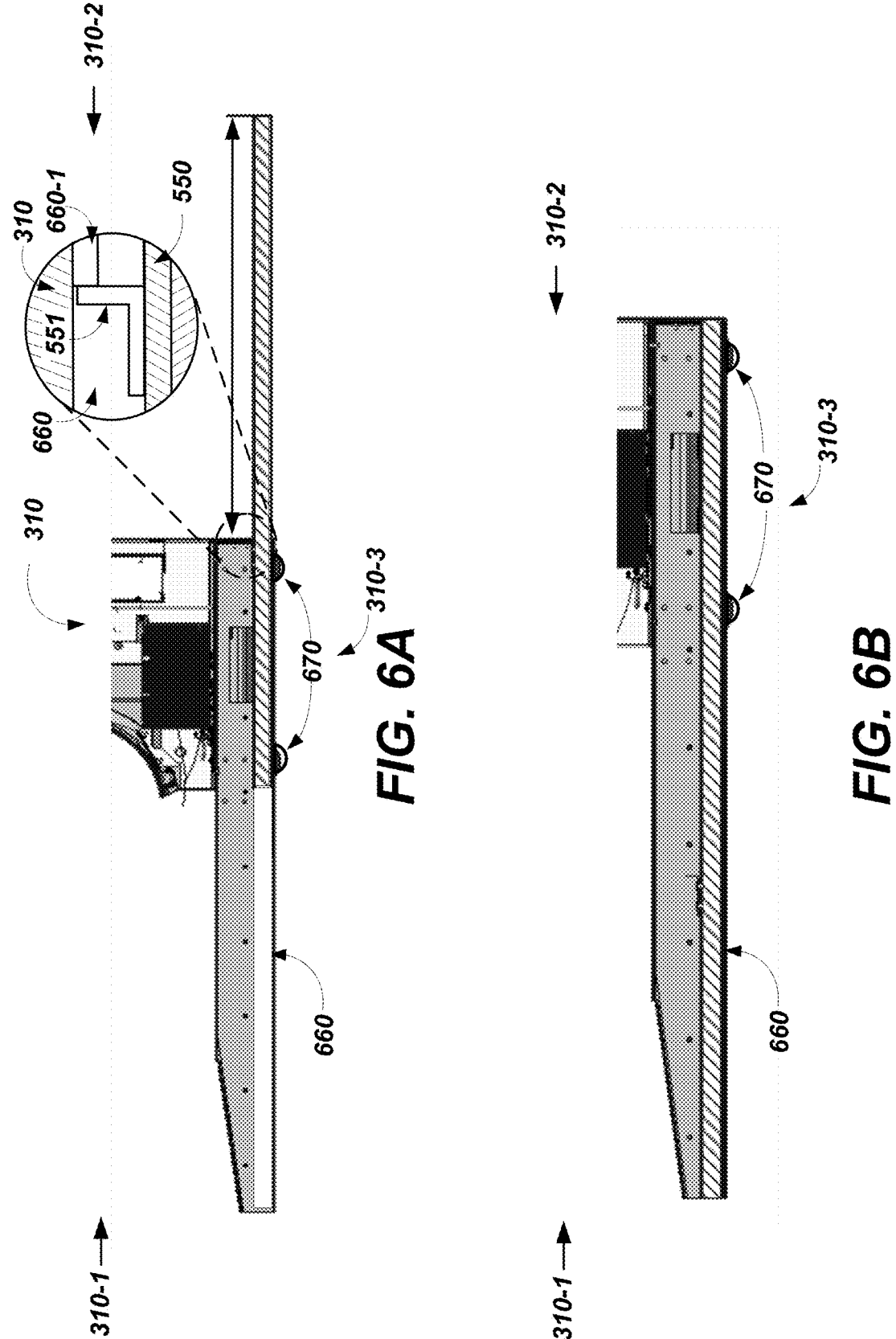
FIG. 6A illustrates an example housing extension interface when a stabilizer is in a deployed configuration in accordance with various embodiments described herein.
FIG. 6B illustrates an example housing extension interface when a stabilizer is in a stowed configuration in accordance with various embodiments described herein.

For example, FIG. 5 illustrates an example elongated member, FIG. 6A illustrates an example housing extension interface when a stabilizer is in a deployed configuration, and FIG. 6B illustrates an example housing extension interface when a stabilizer is in a stowed configuration, in accordance with various embodiments described herein. For ease of illustration, FIGS. 5, 6A, and 6B will be described together.

In some embodiments, as shown in FIG. 5, the stabilizer of the EGM (e.g., the stabilizer 450) may include an elongated member 550. In some embodiments, the elongated member 550 may include structures such as, but not limited to, a bar, a tube, a rod, a shaft, or other structures conducive to achieving the stabilizing effect. As stated above, the elongated member 550 may include a first positive stop 551 and a second positive stop 552. As a non-limiting example, the first positive stop 551 may include a piece of metal that is bent at a right angle, securely attached to the elongated member 550, e.g., through screws and screw holes, at a predetermined location on the elongated member 550 (e.g., positioned between the two ends of the elongated member 550). The second positive stop may include a flange and/or a plate affixed (e.g., welded) to one end of the elongated member 550, and the flange and/or the plate may be configured to be fastened to the second side 310-2 of the display housing 310, e.g., via screws and screw holes. In some embodiments, a distance 553 between the first positive stop 551 and the second positive stop 552 may be substantially equal to the predetermined amount.

During shipping and/or after a full installation (e.g., when the designed/desired stability of the EGM is achieved), the second positive stop 552 (e.g., the flange) may be secured (e.g., screwed) to the second side 310-2 of the display housing 310. This ensures that the elongated member 550 does not protrude from the back of the display housing 310, preventing any potential interference between the elongated members with, e.g., shipping containers, other adjacent EGMs when EGMs are placed back-to-back, or a wall that the EGM may be placed against. In the pre-installation state and/or intermediate state (e.g., when the main display module 315 is mounted to the display housing 310 but the housing extensions are not yet attached), the second positive stop 552 may be unscrewed, allowing the elongated member 550 to be transitioned into the deployed configuration, thereby providing additional fore/aft stability.

Specifically in some embodiments, as shown in FIGS. 6A and 6B, the elongated member 550 and a corresponding linear guide 660 may be positioned at the bottom end 310-3 of the display housing 310. The linear guide 660 may be configured to accommodate and guide the elongated member 550 during movement between the stowed configuration to the deployed configuration. When in the deployed configuration, the elongated member 550 may extend outward from the second side 310-2 (the back) of the bottom end 310-3 of the display housing 310 by at least a predetermined amount. To prevent further extension beyond this point, the first positive stop 551 may engage with a feature 660-1 of the linear guide 660, halting outward movement of the elongated member 550. This ensures that the elongated member does not exceed the specified distance (e.g., the predetermined amount) from the second side 310-2 of the bottom end 310-3 of the display housing 310. The feature 660-1 may include a protrusion on an inside profile of the linear guide 660 that may engage the first positive stop 551.

In the stowed configuration, at least a portion of the elongated member 550 may be retracted further into the linear guide compared to its position in the deployed configuration. For example, the linear guide 660 may include a track tube (e.g., resembling a tunnel structure) extending through the bottom end 310-3 of the display housing 310 from the first side 310-1 to second side 310-2 of the display housing 310. The track tube may have a cross-sectional dimension larger than that of the elongated member 550, allowing the track tube to accommodate the elongated member 550. In some embodiments, the linear guide 660 may be an integral part of the housing extension interface 430, effectively forming a tunnel structure or cavity at the base of rail segments 430-1 and/or 430-2. The track tube may be configured to accommodate and guide the elongated member 550 during movement between the stowed configuration to the deployed configuration. In some embodiments, the elongated member 550 may have a length equal to or shorter than a length of the linear guide 660, allowing the elongated member 550 to fully retract into the linear guide 660 when in the stowed configuration. The second positive stop 552 may be designed to secure onto/fasten to the second side 310-2 of the display housing 310, preventing the elongated member 550 from extending outward from the second side 310-2 of the bottom end 310-3 of the display housing 310 when in the stowed configuration.

Referring back to FIG. 4, in some embodiments, the EGM may include a pair (e.g., two) of elongated members 550. In some embodiments, the display housing 310 may further include a cable port 460 configured to accommodate cables. In some embodiments, the cable port 460 may be located in the bottom end 310-3 of the display housing 310 and between the two elongated members 550. In some embodiments, the cables may include a plurality of cable types configured to accommodate diverse functional requirements, including but not limited to power transmission, data communication, and peripheral connectivity. It is understood that the cable port 460 configuration may vary to accommodate specific cable types, ensuring optimal compatibility and organized cable management within the EGM framework.

In some embodiments, for the purpose of facilitating the movement and transportation of the EGM, as shown in FIGS. 6A and 6B, the EGM may further include one or more wheels 670 positioned at the bottom end 310-3 of the display housing 310. The one or more wheels 670 may protrude downward from the bottom end 310-3 of the display housing 310 (e.g., along the z-axis direction in FIG. 4) to a greater extent than the elongated members 550 protrude downward from the bottom end 310-3 of the display housing 310. Consequently, when resting on the floor, the one or more wheels 670 may make contact with the floor 305 before the elongated member 550 does. In some embodiments, the one or more wheels 670 may be retractable. For example, the one or more wheels 670 may extend out to aid in moving or transporting the EGM and may be retracted, situating themselves, for example, in the bottom end 310-3 of the display housing 310 upon arrival of the EGM at the designated location. Additionally or alternatively, the one or more wheels 670 may include a plurality of casters, such as swivel casters, designed to facilitate movement in all directions.

Figure 7:
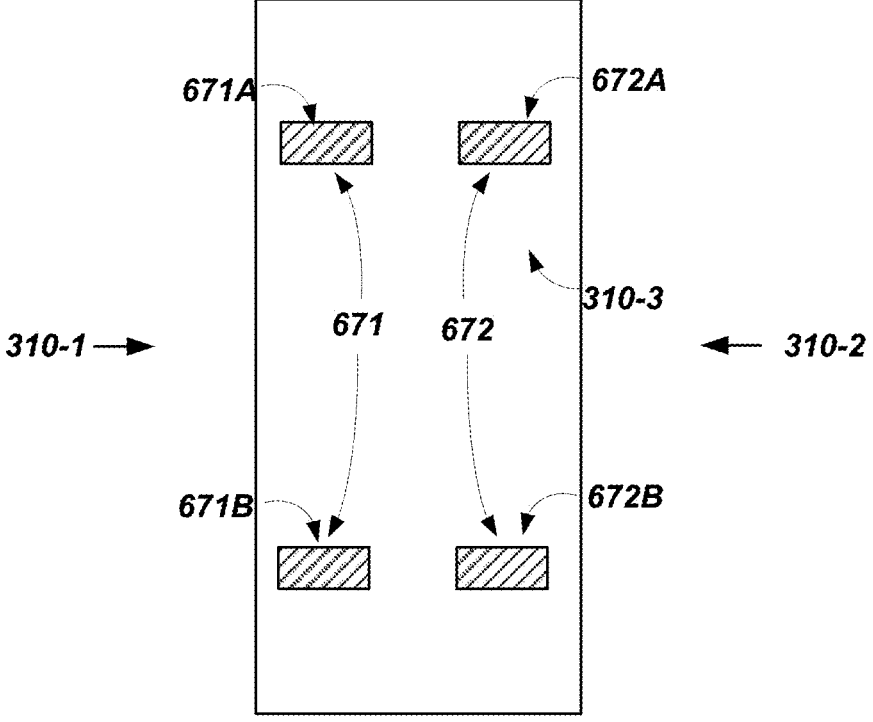
FIG. 7 illustrates a bottom view of an example display housing in accordance with various embodiments described herein.

For example, FIG. 7 illustrates a bottom view of the example display housing in accordance with various embodiments described herein. By way of example, the one or more wheels 670 may include a first set of wheels 671 which includes two wheels 671A and 671B, and a second set of wheels 672 that includes two wheels 672A and 672B. The one or more wheels 670 may be arranged such that the first set of wheels 671 (or the swivel axis of such casters if wheels 671A and 671B are swivel casters) is positioned closer to the first side 310-1 of the bottom end 310-3 of the display housing 310 than the second set of wheels 672 (or the swivel axis of such casters if wheels 672A and 672B are swivel casters).

It is understood that although the linear guide and elongated member configuration is discussed in detail above, other feasible stabilizer configurations may also be applied so that (1) the stabilizer may transit at least between a deployed configuration and a stowed configuration, and (2) when the stabilizer is in the deployed configuration, it may extend the effective lateral base of the display housing.

Figures 8A, 8B:
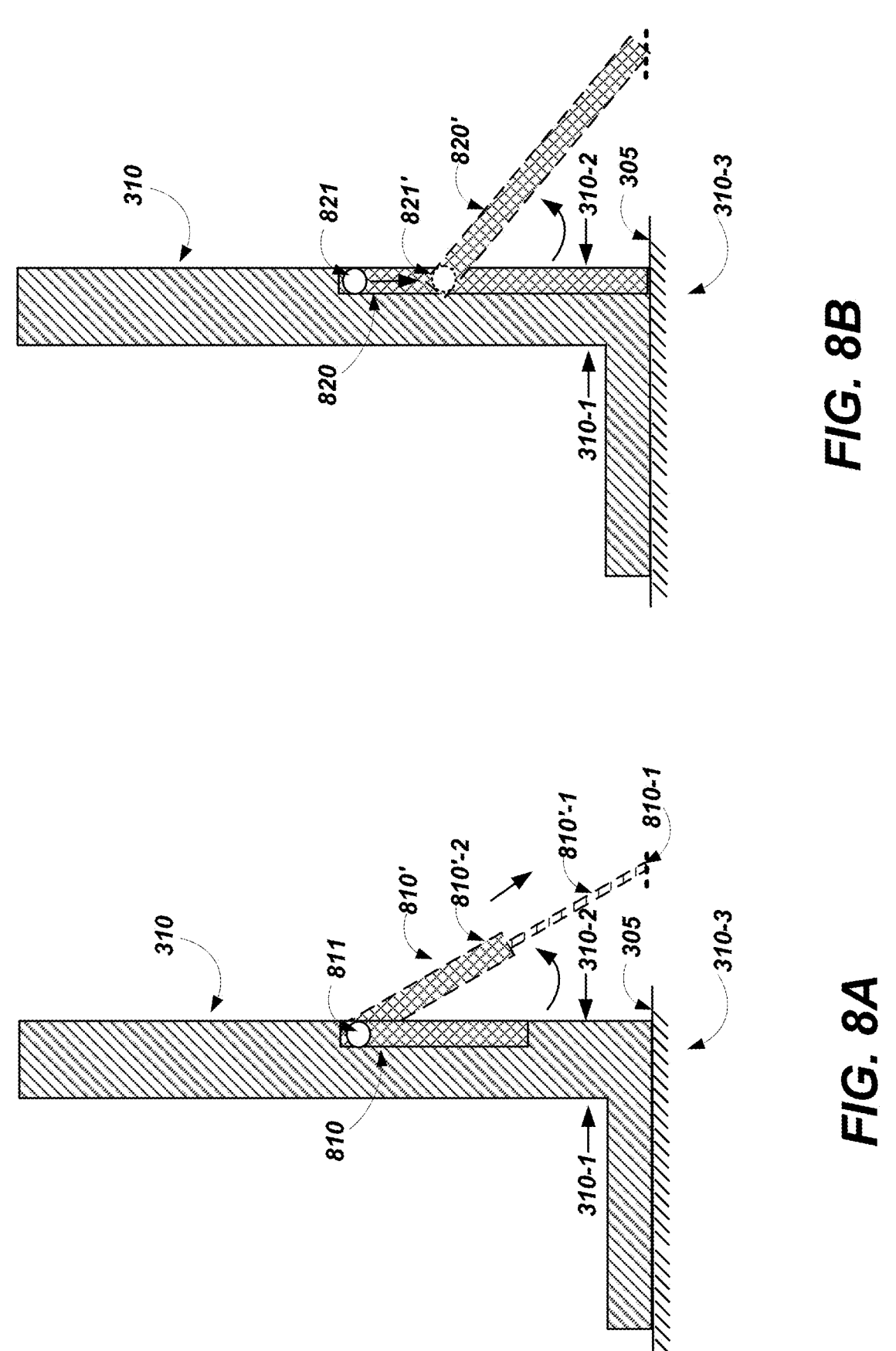
FIGS. 8A-8E illustrate possible alternative stabilizers in accordance with various embodiments described herein.

For example, FIGS. 8A-8E illustrate possible alternative stabilizers in accordance with various embodiments described herein. In one example, as shown in FIG. 8A, the stabilizer of the EGM may include an elongated member 810 where when moving elongated member 810 from the stowed configuration and the deployed configuration (e.g., an elongated member 810'), at least a portion of the elongated member 810 rotates outward from the display housing 310 and about an axis 811 that is above the bottom end 310-3 of the display housing 310. The axis 811 may be parallel to the floor 305 when the bottom end 310-3 of the display housing 310 is resting on the floor 305, and the axis 811 may stay fixed when moving elongated member 810 from the stowed configuration and the deployed configuration. When elongated member 810 is in the deployed configuration (e.g., shown as the elongated member 810'), a lower end 810-1 of the elongated member 810 may reach the floor 305 when the bottom end 310-3 of the display housing 310 is resting on the floor 305. In order to do so, the elongated member 810 may be extendable, enabling a transition from the stowed configuration to the deployed configuration. For example, the elongated member 810 may include a telescoping structure, where a first portion 810'-1 of the elongated member can be smoothly slid or extended into a second portion 810'-2 through a sliding mechanism. This mechanism allows the elongated member 810 to achieve variable lengths according to different configurations. In another example, the elongated member 810 may be constructed as a modular unit, wherein the first portion 810'-1 can be detached and reattached to the second portion 810'-2 at a different location through secure locking mechanisms, providing adaptability in terms of length.

In another example, as shown in FIG. 8B, the stabilizer of the EGM may include an elongated member 820 with a fixed length, where when moving elongated member 820 from the stowed configuration and the deployed configuration (e.g., an elongated member 820'), at least a portion of the elongated member 820 rotates outward from the display housing 310 and about an axis 821 (e.g., located at one end of the elongated member 820) that is above the bottom end 310-3 of the display housing 310. The axis 821 may be parallel to the floor 305 when the bottom end 310-3 of the display housing 310 is resting on the floor 305, and the axis 821 may remain parallel to the floor 305 and may descend toward the bottom end 310-3 of the display housing 310 when moving elongated member 820 from the stowed configuration to the deployed configuration. For example, when in the stowed configuration, the elongated member 820 may be parallel to and/or fit flush with the back of the display housing 310. When transitioned to the deployed configuration (e.g., shown as elongated member 820'), the elongated member 820' may slide down with the axis 821 along the back of the display housing 310. When in the deployed configuration, the elongated member 820' may angle away from the back of the display housing 310 and thus, may provide a supportive foot to the display housing 310.

Figures 8C, 8D:
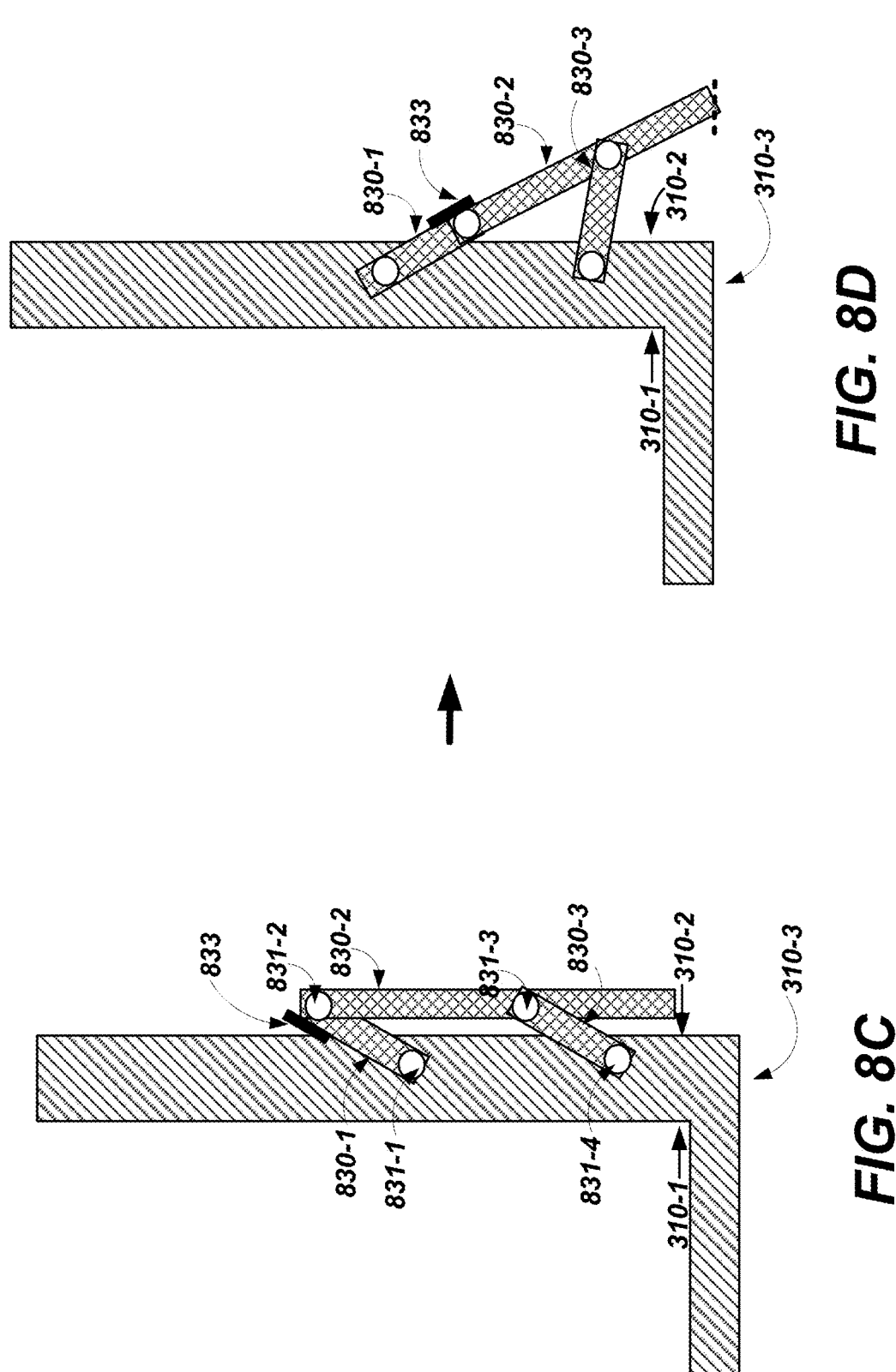

In a further example, as shown in FIGS. 8C and 8D, the EGM may include a stabilizer 830 may include a foldable design that includes hinges or pivot points (e.g., the stabilizer 830 may engage the display housing 310 through a four-bar linkage mechanism). For example, the stabilizer 830 may include support struts 830-1, 830-2, and 830-3 (e.g., with the second side 310-2 of the display housing 310 being the fourth bar of the four-bar linkage mechanism) and axes (e.g., hinges or pivot) 831-1, 831-2, 831-3, and 831-4 connecting the support strut 830-1, 831-2, 831-3, and 831-4. Although, as shown in FIG. 8C, the stabilizer 830 protrudes from the back of the display housing 310 when folded up, it is understood that the stabilizer 830 when folded up may also fit flush with the back of the display housing 310.

In some embodiments, when in the stowed configuration (e.g., the stabilizer 830 being folded, as shown in FIG. 8C), the support strut 831-2 may be parallel to the second side 310-2 of the display housing 310. In some embodiments, the stabilizer 830 may include a rotational stop 833 at an end of the support strut 830-1 that connects with the support strut 830-2. The rotational stop 833 may extend out of the support strut 830-1 such that when in the deployed configuration (e.g., as shown in FIG. 8D), the rotational stop 833 may prevent the support strut 830-2 from further rotating about the axis 831-2 (e.g., the axis connecting the support struts 830-1 and 830-2).

Figure 8E:
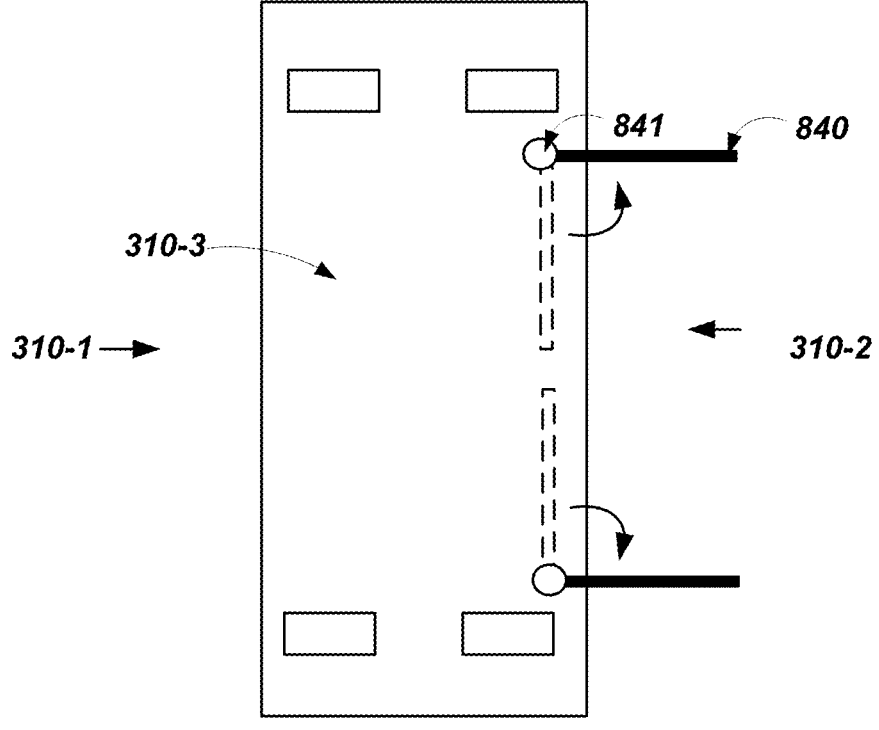

In yet another example, as shown in FIG. 8E, the stabilizer of the EGM may include an elongated member 840 where when moving elongated member 840 from the stowed configuration and the deployed configuration, at least a portion of the elongated member 840 rotates outward from the display housing 310 and about an axis 841 that is above the bottom end 310-3 of the display housing 310. In this configuration, the axis 811 may be perpendicular to the floor 305 when the bottom end 310-3 of the display housing 310 is resting on the floor 305, and the axis 841 may stay fixed when moving elongated member 840 from the stowed configuration and the deployed configuration.

While specific examples have been described with respect to the figures, it will be appreciated that many modifications and changes may be made by those skilled in the art without departing from the scope of the present disclosure.

What is claimed is:

1. An apparatus comprising:
   a display housing comprising:
   a display mount interface configured to securely mount a main display module; and
   a housing extension interface at a first side of a bottom end of the display housing, wherein the housing extension interface is configured to securely mount a housing extension to the display housing, wherein the display housing is configured to support the main display module in an elevated position relative to a floor when the main display module is mounted to the display mount interface and the bottom end of the display housing is resting on the floor; and
   at least one stabilizer connected with the display housing and configured to be movable between a deployed configuration and a stowed configuration, wherein, in the deployed configuration, the stabilizer extends outward from a second side opposite the first side of the bottom end of the display housing by at least a predetermined amount and, in the stowed configuration, the stabilizer is prevented from extending past the predetermined amount.

2. The apparatus of claim 1, wherein the housing extension comprises: a button deck configured to provide a user interface, a player seat configured to provide seating for a user of the apparatus, or both.

3. The apparatus of claim 1, further comprising the main display module, wherein the main display module is mounted to the display mount interface.

4. The apparatus of claim 3, wherein the display housing is no more than 2.5 inches thick in a direction perpendicular to the second side and above the bottom end of the display housing.

5. The apparatus of claim 4, wherein when mounted in the elevated position relative to the floor, the center of gravity of the main display module is at least 7 feet away from the bottom end of the display housing.

6. The apparatus of claim 4, wherein, the main display module comprises a monitor with a diagonal size of at least 28 inches.

7. The apparatus of claim 1, wherein the at least one stabilizer comprises an elongated member.

8. The apparatus of claim 7, further comprising:

at least one linear guide configured to guide the elongated member during movement between the stowed configuration to the deployed configuration, wherein, when the at least one stabilizer is in the stowed configuration, at least a portion of the elongated member is retracted into the linear guide further than when the at least one stabilizer is in the deployed configuration.

9. The apparatus of claim 8, wherein the elongated member has a length equal to or shorter than a length of the linear guide such that, when in the stowed configuration, the elongated member can fully retract into the linear guide.

10. The apparatus of claim 8, wherein the elongated member comprises:

a first end, wherein, when the at least one stabilizer is in the deployed configuration, the first end extends outward from the second side of the bottom end of the display housing;

a second end opposite the first end; and a first positive stop positioned between the first end and the second end, wherein, when the at least one stabilizer is in the deployed configuration, the first positive stop engages with a feature of the linear guide to stop the elongated member from further extending outward from the second side of the bottom end of the display housing beyond the predetermined amount.

11. The apparatus of claim 10, wherein the elongated member further comprises a second positive stop positioned at the first end of the elongated member, wherein the second positive stop is configured to be fastened to the second side of the display housing when in the stowed configuration.

12. The apparatus of claim 7, wherein, when moving the stabilizer between the stowed configuration and the deployed configuration, at least a portion of the elongated member rotates outward from the display housing and about an axis that is above the bottom end of the display housing.

13. The apparatus of claim 12, wherein the axis is parallel to the floor when the bottom end of the display housing is resting on the floor.

14. The apparatus of claim 13, wherein, when moving the stabilizer from the stowed configuration to the deployed configuration, the axis moves down towards the bottom end of the display housing.

15. The apparatus of claim 13, wherein, when moving the stabilizer from the stowed configuration to the deployed configuration, the axis stays fixed and the elongated member extends such that, when the stabilizer is in the deployed configuration, a lower end of the elongated member reaches the floor when the bottom end of the display housing is resting on the floor.

16. The apparatus of claim 12, wherein the axis is perpendicular to the floor when the bottom end of the display housing is resting on the floor.

17. The apparatus of claim 1, wherein the at least one stabilizer engages the display housing through a four-bar linkage mechanism.

18. The apparatus of claim 1, wherein:

the at least one stabilizer comprises two stabilizers, the display housing further comprises a cable port located at the bottom end of the display housing and between the two stabilizers, and the cable port is configured to accommodate cables.

19. The apparatus of claim 1, further comprising one or more wheels located at the bottom end of the display housing, wherein the one or more wheels protrude downward from the bottom end of the display housing to a greater extent than the at least one stabilizer.

20. The apparatus of claim 19, wherein the one or more wheels comprise:

a first set of wheels comprising at least one wheel; and a second set of wheels comprising at least one wheel, wherein the one or more wheels are arranged such that the first set of wheels is positioned closer to the first side of the bottom end of the display housing than the second set of wheels.

* * * * *